(12) United States Patent
Knox et al.

(10) Patent No.: US 7,574,732 B2
(45) Date of Patent: *Aug. 11, 2009

(54) OBJECT LOCATION BASED SECURITY USING RFID

(76) Inventors: Michael Knox, 72 Cove Dr., Manhasset, NY (US) 11030-1311; Raj Bridgelall, P.O. Box 2095, Morgan Hill, CA (US) 95038

( * ) Notice: Subject to any disclaimer, the term of this patent is extended or adjusted under 35 U.S.C. 154(b) by 890 days.

This patent is subject to a terminal disclaimer.

(21) Appl. No.: 10/954,957

(22) Filed: Sep. 29, 2004

(65) Prior Publication Data

US 2006/0107307 A1 May 18, 2006

(51) Int. Cl.
*G06F 7/04* (2006.01)
*H04L 9/32* (2006.01)
*G06F 17/30* (2006.01)
*G06F 7/58* (2006.01)
*G06K 7/016* (2006.01)

(52) U.S. Cl. .......................... 726/3; 380/258; 342/118; 342/129; 342/145; 342/45; 340/686.1; 340/572.1; 340/825.49

(58) Field of Classification Search .................. 726/3; 380/258; 342/118, 129, 145, 45; 340/686.1, 340/572.1, 825.49

See application file for complete search history.

(56) References Cited

U.S. PATENT DOCUMENTS 6,356,230 B1 * 3/2002 Greef et al. ................. 342/127
6,414,626 B1   7/2002 Greef et al.
6,577,238 B1   6/2003 Whitesmith et al.
7,030,761 B2 * 4/2006 Bridgelall et al. ........ 340/572.2
7,119,738 B2 * 10/2006 Bridgelall et al. ........... 342/129
7,170,412 B2 * 1/2007 Knox et al. ............... 340/572.1
2002/0123325 A1   9/2002 Cooper
2002/0126013 A1   9/2002 Bridgelall et al.
2004/0002305 A1   1/2004 Byman-Kivivuori et al.
2004/0024884 A1   2/2004 Rekimoto et al.
2004/0203846 A1 * 10/2004 Caronni et al. ........... 455/456.1

FOREIGN PATENT DOCUMENTS

WO   WO2004/0003801 A   1/2004

OTHER PUBLICATIONS

ISR for PCT/US2005/033120, Feb. 13, 2006.
Written Opinion for PCT/US2005/033120, Feb. 13, 2006.

* cited by examiner

*Primary Examiner*—Michael J Simitoski

(57) ABSTRACT

A system and method for controlling access to a wireless networking system using RFID tags is provided. The security system and method uses RFID tags to determine the location of mobile computing device. The security system and method selectively allows access to the wireless networking system based on the determined location of the mobile computing device. For example, the security system and method will permit access to the wireless networking system if the mobile computing device is determined to be in an area of permitted access. Conversely, the security system and method will deny access to the wireless networking system if the mobile computing device is determined to be not within an area of permitted access. Thus, the system and method is able to effectively control access to the wireless networking system by only permitting access to mobile devices within designated areas.

27 Claims, 9 Drawing Sheets

| FUND FREQ (MHz) | RELATIVE PHASE MEASUREMENT (RADIANS) |
|---|---|
| 912 | 4.135648662 |
| 922 | 2.958062428 |
| 910 | 0.654528847 |
| 904 | 1.294354711 |
| 926 | 0.33711675 |
| 918 | 5.779008106 |
| 908 | 5.25659434 |
| 906 | 4.975474525 |
| 924 | 5.839182243 |
| 902 | 0.113234896 |
| 914 | 4.216768477 |
| 920 | 6.26012792 |
| 928 | 2.018236565 |
| 916 | 4.497888291 |

| FUND FREQ (MHz) | RELATIVE PHASE UNWRAPPED (RADIANS) |
|---|---|
| 902 | 0.113234896 |
| 904 | 1.294354711 |
| 906 | 4.975474525 |
| 908 | 5.25659434 |
| 910 | 6.937714155 |
| 912 | 10.41883397 |
| 914 | 10.49995378 |
| 916 | 10.7810736 |
| 918 | 12.06219341 |
| 920 | 12.54331323 |
| 922 | 15.52443304 |
| 924 | 18.40555286 |
| 926 | 19.18667267 |
| 928 | 20.86779249 |

OBJECT LOCATION BASED SECURITY USING RFID

FIELD OF THE INVENTION

This invention generally relates to networking systems, and more specifically relates to wireless networking security and radio frequency identification tags (RFIDs).

BACKGROUND OF THE INVENTION

In modern computer networking systems there is a growing need for improved security. This includes preventing unauthorized access to computer networks while providing needed access to authorized users in an efficient and cost effective manner. Security is of particular importance in wireless computer networks, which, by their vary nature are particularly susceptible to unauthorized access and a variety of different types of attacks.

Attacks on wireless networks can come in several forms, such as passive attacks, active attacks, man-in-the-middle attacks and jamming attacks. Passive attacks generally come in the form of eavesdropping, where an attacker will listen to network traffic in order to capture secure information such as user passwords. Active attacks typically involve attackers performing network operations in malicious intent. Man-in-the middle attacks typically involve attackers that set up rogue access points in order to redirect network traffic to another destination. Finally, jamming commonly involves an attacker that obtains control over the administration of an access point and triggers denial of service to legitimate users.

With the increasing popularity of wireless networking in a wide variety of implementations, security for wireless networking systems is becoming increasing critical. Specifically, there s a strong need for the ability to effectively prevent unauthorized access and thwart attacks on wireless networks. Unfortunately, some previous attempts at providing security for wireless networking systems have provided relatively low levels of security or have resulted in significant inconvenience to authorized network users.

Accordingly, it is desirable to provide an improved system and method for providing security to wireless networking. Furthermore, other desirable features and characteristics of the present invention will become apparent from the subsequent detailed description and the appended claims, taken in conjunction with the accompanying drawings and the foregoing technical field and background.

BRIEF SUMMARY OF THE INVENTION

The present invention provides a security system and method for controlling access to a wireless networking system using RFID tags. The security system and method uses RFID tags to determine the location of mobile computing device. The security system and method selectively allows access to the wireless networking system based on the determined location of the mobile computing device. For example, the security system and method will permit access to the wireless networking system if the mobile computing device is determined to be in an area of permitted access. Conversely, the security system and method will deny access to the wireless networking system if the mobile computing device is determined to be not within an area of permitted access. Thus, the system and method is able to effectively control access to the wireless networking system by only permitting access to mobile devices within designated areas. This limits the ability of outside users to access the wireless networking system without limiting the ability of users inside designated areas. The system and method can be combined with other networking security procedures to provide an even greater level of security to the networking system.

As stated above, the security system and method uses RFID tags to determine the location of the mobile computing device. One method that can be used to determine the location of the mobile unit using RFID tags is based on phase difference of arrival (PDOA) of signals from the RFID tag. In this method, an RFID reader and a distance calculator can be used to efficiently and accurately determine the location of mobile unit using the RFID tag coupled to the mobile unit. In this embodiment, the RFID reader transmits a plurality of signals to the RFID tag, with the plurality of signals having different fundamental frequencies. In response, the RFID tag backscatter modulates the plurality of transmitted signals to create a plurality of backscatter-modulated signals. The RFID reader receives and demodulates the plurality of backscatter-modulated signals. The distance calculator determines the phase of the plurality of backscatter-modulated signals and determines a rate of change of the phase in the backscatter-modulated signals with respect to the rate of change in the fundamental frequency of the transmitted signals and uses this information to calculate the distance to the RFID tag. This distance to the RFID tag can then be used to determine if the mobile computing device is within the permitted access area.

In one more specific embodiment, an array of RFID readers is used to determine the object location. Again, each of the RFID readers transmits a plurality of signals to the RFID tag coupled to the mobile computing device, with the signals from each RFID reader having different fundamental frequencies. In response, the RFID tag backscatter modulates the plurality of transmitted signals to create a plurality of backscatter-modulated signals. The array of RFID readers receives and demodulates the plurality of backscatter-modulated signals. The distance calculator determines the phase of the plurality of backscatter-modulated signals and determines a rate of change of the phase in the backscatter-modulated signals with respect to the rate of change in the fundamental frequency of the transmitted signals and uses this information to calculate the distance between each RFID reader and the RFID tag. Using the distances to the array of RFID readers and the known location of the readers, an accurate location of the mobile computing device can be determined using trilateration techniques. From this location, it can be determined if the mobile computing device is within a permitted access area, and access to the wireless networking system can be permitted or denied based on that determination.

BRIEF DESCRIPTION OF DRAWINGS

The preferred exemplary embodiment of the present invention will hereinafter be described in conjunction with the appended drawings, where like designations denote like elements, and:

FIGS. 8 and 9 are table views of an exemplary data set in accordance with an exemplary embodiment of the present invention.

DETAILED DESCRIPTION OF THE INVENTION

Figure 1:
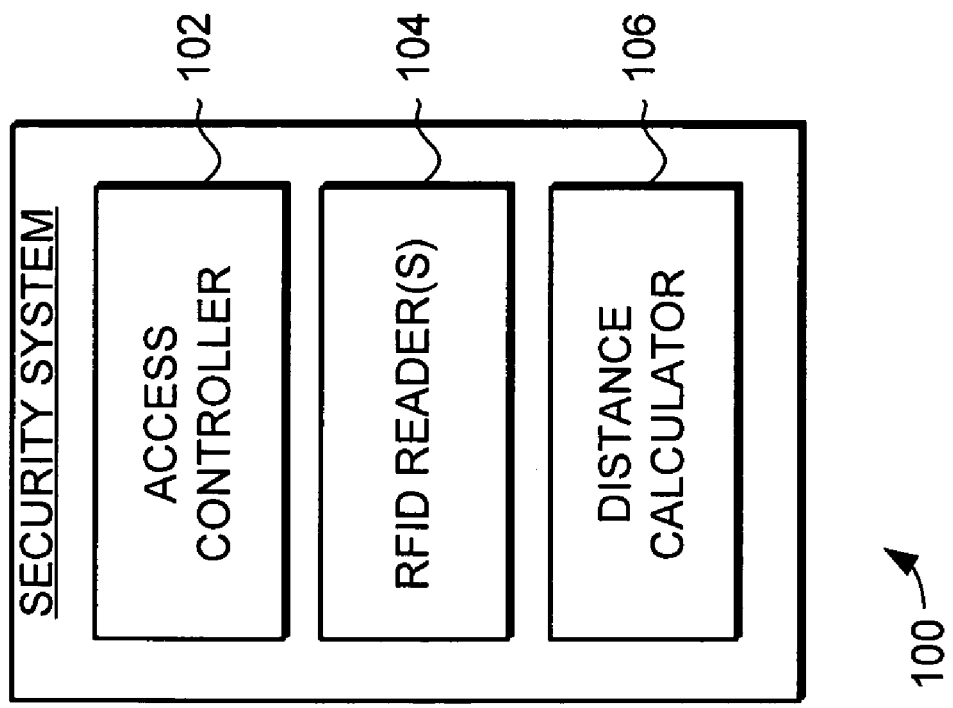
FIG. 1 is a schematic view of a wireless networking security system in accordance with an exemplary embodiment of the present invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Generally, the present invention provides a system and method for locating objects using Radio Frequency Identification (RFID) tags. The system and method uses the phase of backscatter-modulated signals from the RFID tags with respect to the fundamental frequency of the transmitted signals to efficiently and accurately determine the location of objects.

RFID is a technology that incorporates the use of electromagnetic or electrostatic coupling in the radio frequency spectrum to identify objects to which RFID tags are affixed. RFID systems in general provide the advantage of not requiring direct contact or line-of-sight scanning. A typical RFID system includes an RFID reader and a plurality of RFID tags that are affixed to the objects of interest. The RFID reader includes an antenna and also includes or is coupled to a transceiver. The RFID reader uses the antenna and transceiver to transmit radio frequency signals to the RFID tag. The RFID reader has the ability to select one or more tags by transmitting an identifier that specifies one or more of the tags from a plurality of tags. When an RFID reader selects an RFID tag, the RFID tag is put into a responsive mode, with other tags going into a muted state.

When put into responsive mode, the tag transmits data back to the reader by modulating a backscattered signal that is received at the RFID reader antenna. As one example, some tags use variable impedance coupled to the antenna that can be used to change the amount of energy that is reflected back by the tag. These tags can transmit data to the reader by selectively varying the impedance to modulate the backscattered signals. Similarly, these tags can be put into a "muted" or non-responsive state by selecting and maintaining an impedance value that minimizes the backscattering from that tag.

Thus, an RFID reader can be used to select one or more RFID tags and retrieve data from the selected tags. As such, RFID tags can be used to identify and track large numbers of objects. Furthermore, because RFID tags have a relatively low per-unit cost, they have the ability to track large numbers of objects at relatively low costs.

RFID tags are used in a variety of commercial contexts that require a unique identification system for large numbers of items. As examples, RFID tags are used in everything from department store inventory and checkout systems to the tracking of military supplies. RFID systems are often preferred for object identification due to their increased range, lack of a line of sight requirement between a tag and its reader, and high multi-tag throughput.

RFID tags are available in a variety of configurations, shapes and sizes. For example, different tags for different applications typically have a shape and size appropriate for its application. RFID tags are commonly categorized as active, passive or semi-passive. Active RFID tags include an internal battery used to transmit data and typically include the ability to read and write greater amounts of stored data than either passive or semi-passive tags. Passive RFID tags transmit by reflecting and absorbing energy from the RF transmissions from the reader, and use absorbed energy from the reader for data storage, retrieval, and manipulation. Semi-passive tags include an internal battery that is used for data storage, retrieval, and manipulation, while transmitting data by reflecting and absorbing energy from the reader.

Passive and semi-passive tags are typically lighter and less expensive than active tags. Passive tags offer a virtually unlimited operational lifetime because they do not require a battery for operation. The trade off is that they typically have a shorter read range than active tags, and require a higher output power from the reader. It is important to note that governmental restrictions in many jurisdictions restrict reader output power to ensure safety and to minimize interference between devices that must share frequency bands.

Passive and semi-passive tags include both read-only tags that are programmable once with a unique set of data that cannot be later modified, and read/writeable tags that can be rewritten one or more times using a suitable RFID writing device.

RFID systems can use a variety of techniques to transmit data to and from the tag. For transmission to the tag, the data can be transmitted using any of a variety of modulation techniques, including amplitude modulation (AM), phase modulation (PM), and frequency modulation (FM). Furthermore, the data transmitted to the tag can be encoded using any of a variety of techniques, including frequency shift keying (FSK), pulse position modulation (PPM), pulse duration modulation (PDM) and amplitude shift keying (ASK).

As discussed above, passive and semi-passive tags transmit by selectively reflecting and absorbing energy from the reader, in a process generally referred to as backscatter modulation. Again, in backscatter modulation, the data can be encoded using a variety of techniques. For example, the data can be encoded using FSK, where the tag absorb-reflects at one rate to represent a first state (e.g., "one") and at another rate to represent a second state (e.g., "zero"). As another example, the data can be encoded using ASK, where the tag absorb-reflects at one rate for some duration to represent a first state (e.g., "one") and ceases back scatter modulation for another duration to represent a second state (e.g., "zero"). RFID systems also typically use a variety of different frequency ranges, including 30 KHz-500 KHz, 850 MHz-950 MHz and 2.4 GHz-2.5 GHz, depending on the regulatory spectrum allocations and performance requirements matched to various application requirements. For example, lower frequency systems typically provide better electromagnetic penetration through water while higher frequency systems do not. Lower frequency passive systems commonly operate within a few inches with small reader antennas while higher frequency systems commonly operate within several feet with similarly sized antennas. Also, lower frequency regulatory allocations are generally more widespread worldwide and typically allow more output power for passive tags than do higher frequency systems. However, where higher frequency spectrum is available for RFID, such as within FCC regulated domains, the output power is substantial and allows for robust long-range performance Turning now to FIG. 1, a security system 100 for controlling access to a wireless networking system is illustrated schematically. The security system 100 includes an access controller 102, an RFID reader 104 and a distance calculator 106. The security system 100 controls access to the wireless networking system using RFID tags. Specifically, the system 100 uses RFID tags to determine the location of a mobile computing device. The security system 100 selectively allows access to the wireless networking system based on the determined location of the mobile computing device. For example, the security system 100 will permit access to the wireless networking system if the mobile computing device is determined to be in an area of permitted access. Conversely, the security system 100 will deny access to the wireless networking system if the mobile computing device is determined to be not within an area of permitted access. Thus, the system 100 is able to effectively control access to the wireless networking system by only permitting access to mobile devices within designated areas. This limits the ability of outside users to access the wireless networking system without limiting the ability of users inside designated areas. Furthermore, the system 100 can be combined with other networking security procedures to provide an even greater level of security to the networking system. The system 100 can also be used to limit access to a system to particular parties based on position. For example, it can be used to limit access to a wireless network system to patrons within a building, such as a hotel.

As stated above, the security system 100 uses RFID tags coupled to the computing device to determine the location of the device. This is accomplished by interrogating RFID tag(s) with the RFID reader 104 and determining the distance to the RFID tags using the distance calculator 106. From this distance, it can be determined if the mobile computing device is within a permitted access area.

The distance calculator 104 can be implemented to determine the distance to the RFID tag using any suitable technique. One suitable method that can be used to determine the location of the mobile unit using RFID tags is based on phase difference of arrival (PDOA) of signals from the RFID tag. In this embodiment, the RFID reader 104 transmits a plurality of signals to the RFID tag, with the plurality of signals having different fundamental frequencies. In response, the RFID tag backscatter modulates the plurality of transmitted signals to create a plurality of backscatter-modulated signals. The RFID reader 104 receives and demodulates the plurality of backscatter-modulated signals. The distance calculator 106 determines the phase of the plurality of backscatter-modulated signals and determines a rate of change of the phase in the backscatter-modulated signals with respect to the rate of change in the fundamental frequency of the transmitted signals and uses this information to calculate the distance to the RFID tag. This distance to the RFID tag can then be used to determine if the mobile computing device is within the permitted access area.

In one more specific embodiment, an array of RFID readers 104 is used to determine the object location. Again, each of the RFID readers 104 transmits a plurality of signals to the RFID tag coupled to the mobile computing device, with the signals from each RFID reader 102 having different fundamental frequencies. In response, the RFID tag backscatter modulates the plurality of transmitted signals to create a plurality of backscatter-modulated signals. The array of RFID readers 104 receives and demodulates the plurality of backscatter-modulated signals. The distance calculator 106 determines the phase of the plurality of backscatter-modulated signals and determines a rate of change of the phase in the backscatter-modulated signals with respect to the rate of change in the fundamental frequency of the transmitted signals and uses this information to calculate the distance between each RFID reader 104 and the RFID tag. Using the distances to the array of RFID readers 104 and the known location of the readers 104, an accurate location of the mobile computing device can be determined using trilateration techniques. From this location, it can be determined if the mobile computing device is within a permitted access area, and access to the wireless networking system can be permitted or denied based on that determination.

It should be noted that the distance calculator 106 could be implemented in variety of ways. For example, the distance calculator can be fully implemented as part of each RFID reader 104. In another implementation, the distance calculator can be implemented at a central location, with the phase and fundamental frequency data used to calculate the distance transmitted to the central computer using any suitable networking technology. Finally, the distance calculator 104 can be implemented partially in the reader 104, and partially at a central location. For example, the phase determinations can be made at each reader, with the final distance and location calculations made at central computer system linked to the readers.

In one embodiment, an RFID tag is coupled to the mobile computing device, and the RFID readers are distributed at known locations around the area of interest. Thus, by calculating the distance to the RFID tag to one or more RFID readers at known locations, the location of the mobile computing device is determined. In another embodiment, the RFID reader is coupled to the mobile computing device and RFID tags are distributed in known locations about the area of interest. Again, by calculating the distance from the RFID reader on the mobile computing device to one or more RFID tags at known locations, the location of the mobile computing device is determined. Thus, in both embodiments the location of the mobile computing device is determined, and that location is used to selectively permit access to the wireless networking system.

As stated above, the plurality of signals transmitted to the RFID tag are selected to have different fundamental frequencies. To have a plurality of signals selected to have different fundamental frequencies there need only be at least one transmitted signal with a fundamental frequency different from at least one other transmitted signal. In general additional signals with additional different fundamental frequencies provides for increased accuracy of the distance calculation. However, it should be noted that nothing prevents the utilization of additional transmitted signals that have the same frequency as other transmitted signals. Phase measurements taken with transmitted signals having the same fundamental frequency as other transmitted signals can be combined with the other phase measurements to generate a more accurate overall calculation of the phase versus frequency rate of the change.

Figure 2:
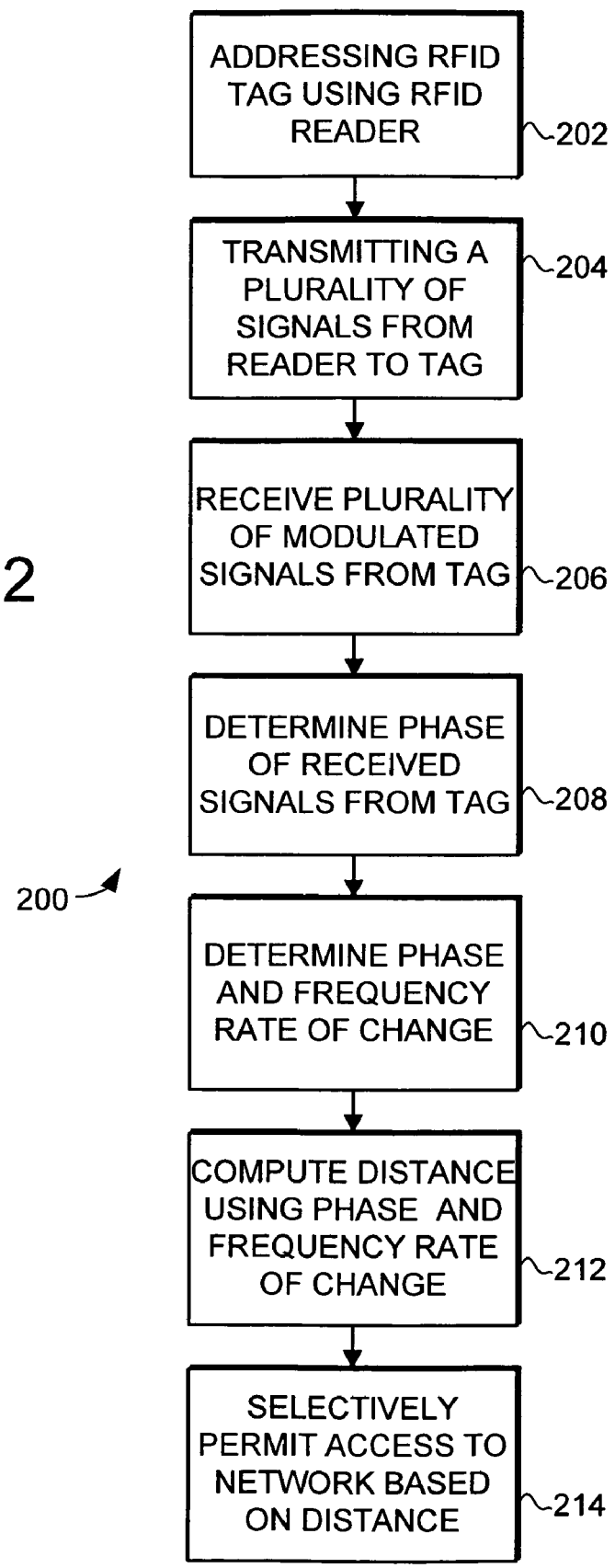
FIG. 2 is a flow diagram of a method for controlling access to a wireless networking system an object in accordance with an exemplary embodiment of the present invention.

Turning now to FIG. 2, a method 200 for controlling access to a wireless networking system is illustrated. In the first step 202, the RFID tag is addressed. Addressing the RFID tag uses a tag ID to select one RFID tag among potentially thousands of others. Addressing puts the selected RFID tag into a responsive mode where it will modulate and backscatter received signals from the reader. Tags that are not selected will typically go into a muted state, where their reflections are intentionally minimized. In the embodiment where the RFID tag is coupled to the mobile computing device, the tag would typically be addressed when the corresponding mobile computing device attempts to access the wireless networking systems. In other embodiments, the addressed tags would be those determined to be in the area of the mobile computing device.

The next step 204 is to transmit a plurality of signals from the RFID reader to the tag, with the signals transmitted having a different fundamental frequency. Again, to provide a suitable plurality of transmitted signals there must only be at least one transmitted signal with a fundamental frequency different from at least one other transmitted signal, and additional transmitted signals can have duplicate frequencies. Furthermore, a "fundamental frequency" of a signal, as the term is used in this application, comprises one or more of the primary frequency components in the signal. For example, the fundamental frequency of a signal can be the frequency of the carrier signal without harmonics. It should be noted that the transmitted signal is not necessarily purely sinusoidal and thus may in fact carry harmonics due to the need for pulse shaping at the receivers.

The plurality of transmitted signals are received by the RFID tag. In response to these signals, the selected RFID tag backscatter modulates the plurality of transmitted signals to create a plurality of backscatter-modulated signals. The RFID reader receives and demodulates the plurality of backscatter-modulated signals. Because of the fundamental frequency difference in the originally transmitted signal, each of the plurality of backscatter-modulated signals received back at the reader will have a distinct relative phase.

In step 206, the plurality of modulated signals are received back at the RFID reader. The next step 208 is to determine the phase for the plurality of modulated signals. The phase of the received signals can be determined in variety of ways, such as channel demodulation. Such a method will be described in greater detail below.

The next step 210 is to determine the rate of change of the phase with respect to the rate of change of the fundamental frequency. The rate of change of the phase with respect to the rate of change of the fundamental frequency can be calculated from the plurality of phase measurements and plurality of transmitted signal fundamental frequencies using variety of different techniques. For example, in one application, the rate of change of phase with respect to fundamental frequency is determined by performing a linear trend fit of phase measurements and corresponding fundamental frequency values. The linear trend fit is then used to generate a more accurate rate of change or "estimated slope" of phase and frequency.

It should be noted that in some applications steps 204-210 would be recursively continued with more transmissions and phase measurements until the rate of the change could be calculated within a specified level of accuracy. For example, the steps 204-210 can be continued until the linear trend fit generates an estimated slope that is within a desired confidence level, where the confidence level can be calculated using any suitable technique such as "goodness of fit" or any other method of assessing the variance of the data trend from a straight line.

The next step 212 is to determine the distance between the RFID reader and the RFID tag using the rate of change of the phase of the received signal with respect to the rate of change of the fundamental frequency of the transmitted signal. As will be explained in greater detail later, the distance (D) between the RFID reader and the RFID tag can be calculated as:

$$D = \frac{\Delta\phi}{\Delta f} \frac{c}{4\pi} \quad (1.)$$

Where $\Delta\phi$ is the change in phase of the backscatter-modulated signals, $\Delta f$ is the change in fundamental frequency of the transmitted signals, and c is the speed of light in meters per second or feet per second depending on the desirable units of the distance measurement. Thus, the distance can be calculated using the rate of change in the phase ($\Delta\phi$) of the backscatter-modulated signals versus the rate of change in the fundamental frequency ($\Delta f$) of the transmitted signals.

With the distance calculated in step 212, the next step 214 is to selectively permit access to the network based on the calculated distance. For example, in this step the access can be permitted to the wireless networking system if the mobile computing device is determined from the calculated distance to be in an area of permitted access. Conversely, the method will deny access to the wireless networking system if the mobile computing device is determined from the calculated distance to be not within an area of permitted access. Thus, the method is able to effectively control access to the wireless networking system by only permitting access to mobile devices within designated areas. This limits the ability of outside users to access the wireless networking system without limiting the ability of users inside designated areas.

In one application, the method 200 can be applied with an array of RFID readers to more completely determine the object location. In this embodiment, each of the RFID readers performs steps 204 and 206, and the distance to each RFID reader is calculated in using the phase for the backscatter-modulated signals received at that RFID reader and the fundamental frequencies for the originally transmitted signals. Using the distances to at least three RFID readers and the known location of those readers, a highly accurate location can be determined using trilateration techniques. Thus, the method 200 is able to efficiently determine a highly accurate location for a mobile computing device that includes an RFID tag.

In these multi-reader applications, steps 204 and 206 will typically be performed on a reader-by-reader basis. For example, the plurality of signals will be transmitted and received by a first reader, and a plurality of signals then transmitted and received by a second reader and so on. This provides the advantage of minimizing interferences that could result from multiple concurrent transmissions from multiple readers.

In another application, the method 200 can be applied to a plurality of different RFID tags distributed about an area of interest using a reader affixed to the mobile computing device. In this embodiment, the RFID reader performs steps 202 to 212 for each tag, and the distance to RFID tag is calculated using the phase for the backscatter-modulated signals received at that RFID reader and the fundamental frequencies for the originally transmitted signals. Again, using the distances to at least three RFID tags and the known location of those tags, a highly accurate location of the reader can be determined using trilateration techniques. Thus, the method 200 is able to efficiently determine a highly accurate location for a mobile computing device that includes an RFID reader.

The system and method illustrated in FIGS. 1 and 2 can provide a high accuracy of object location. Also, because the system and method can use relatively inexpensive passive or semi-passive RFID tags, the system and method can be applied to a high number of objects at a relatively low per-unit cost.

As discussed above, the RFID reader transmits a plurality of signals to the RFID tag on the object that is to be located, with the signals selected to have different fundamental frequencies. Again, to implement signals with a plurality of different frequencies only a least one transmitted signal with a fundamental frequency different from at least one other transmitted signal is needed. Furthermore, it should be noted that that nothing prevents the utilization of additional transmitted signals that have the same frequency as other transmitted signals. In general however, transmitting more signals with new frequencies will be desirable to improve the accuracy of the system.

Several different methods and procedures can be used in selecting the frequencies of the plurality of transmitted signals. One significant factor is the regulatory constraints imposed on the system. For example, in some regulatory systems it will be desirable to base frequency selection on channel availability. In another example, frequency selection can be randomly selected.

Specifically, in certain bands such as 915 MHz and 2.45 MHz ISM bands, the FCC and other regulatory agencies allow up to 4 watts of effective radiated power if suitable spread spectrum techniques are employed. The object location system can be implemented to randomly select transmission frequencies (i.e., channels) within one or more frequency bands and thus meet the requirements of a spread spectrum system. By randomly selecting frequencies and otherwise complying with the regulatory framework, the object location system can thus transmit to the higher power level allowed such systems. Transmitting at higher power levels increasing the effective range of the system and thus the overall performance of the system.

As another example, other regulatory bodies such as CEPT in Europe specify the use of "listen before transmit" procedures instead of random hopping used in spread spectrum. In such a system, the transmitter listens for transmissions at a frequency channel before making its own transmission in that channel. If the transmitter detects activity in that channel, the transmitter will switch to the next frequency channel. There it will again listen to detect other transmissions before transmitting itself. This process is continued until an available channel is found and the transmission is made in that available channel. A variety of different channel selection algorithms are available to implement such a system based on sensing channel occupation or the traditional carrier sense multiple access (CSMA) methods. In any event, the object location system can select transmission frequencies using the "listen before transmit" procedure in such a way that it is most compatible with the regulatory framework for which the system is designed to operate. Without the ability to use such a channel selection algorithm the object location system would be limited in the power that can be used in transmitting to the RFID tag, resulting in less range and accuracy for the system.

The system and method illustrated and described with reference to FIGS. 1 and 2 can be adapted to provide access control for a wide variety of wireless networking systems. For example, the system and method can be adapted to provide access control for WLAN using the various 802.11 based protocols, including Wi-Fi networks. Likewise, the system and method can be adapted to provide access control for various WiMAX based systems now in development. The system and method can also be adapted to WWAN systems, and the various wireless phone network systems.

In many applications, the system and method would be combined with other traditional based methods of networking and wireless security. For example, the system and method can be combined with networking security protocols that rely upon encryption and/or authentication security procedures. In such a system the standard communication could be established first using standard encryption technology and then authenticated using RFID based location determination. Using this technique can allow user feedback on why network access is or is not allowed. In another embodiment, RFID based location determination is performed before standard communication using standard encryption technology can be attempted. In such an implementation attempts to access the network are forbidden until after the location determination is made.

For example, the system and method can be combined with networking security systems that use encryption techniques to provide networking security. As a specific example, Wired Equivalent Privacy (WEP) is a protocol that provides security to wireless local networks based on the 802.11 Wi-Fi standard. WEP uses a combination of secret user keys and system generated values to encrypt data sent over wireless network. Another specific example, Wi-Fi Protected Access (WPA) is security technology that uses a temporal key integrity protocol with built-in authentication to provide improved security over WEP. Finally, other techniques use authentication and access control features such as Data Link Control (DLC) or Media Access Control (MAC) address filtering that deny network requests from unauthorized clients. These and other techniques can be combined with the system and method of the present invention to provide improved wireless networking security.

These other security techniques can be combined with the RFID-based location determination system and method using a variety of procedures. As one example, the system and method can be used first to determine the location of mobile computing device before any attempt at authentication or other communication is allowed to proceed. Thus, the system and method can be used to prevent mobile computers from outside authorized areas from even attempting to be authorized or otherwise gain access to the wireless networking system. Such a system would have the advantage of preventing many common attacks on traditional networking security systems.

Figure 3:
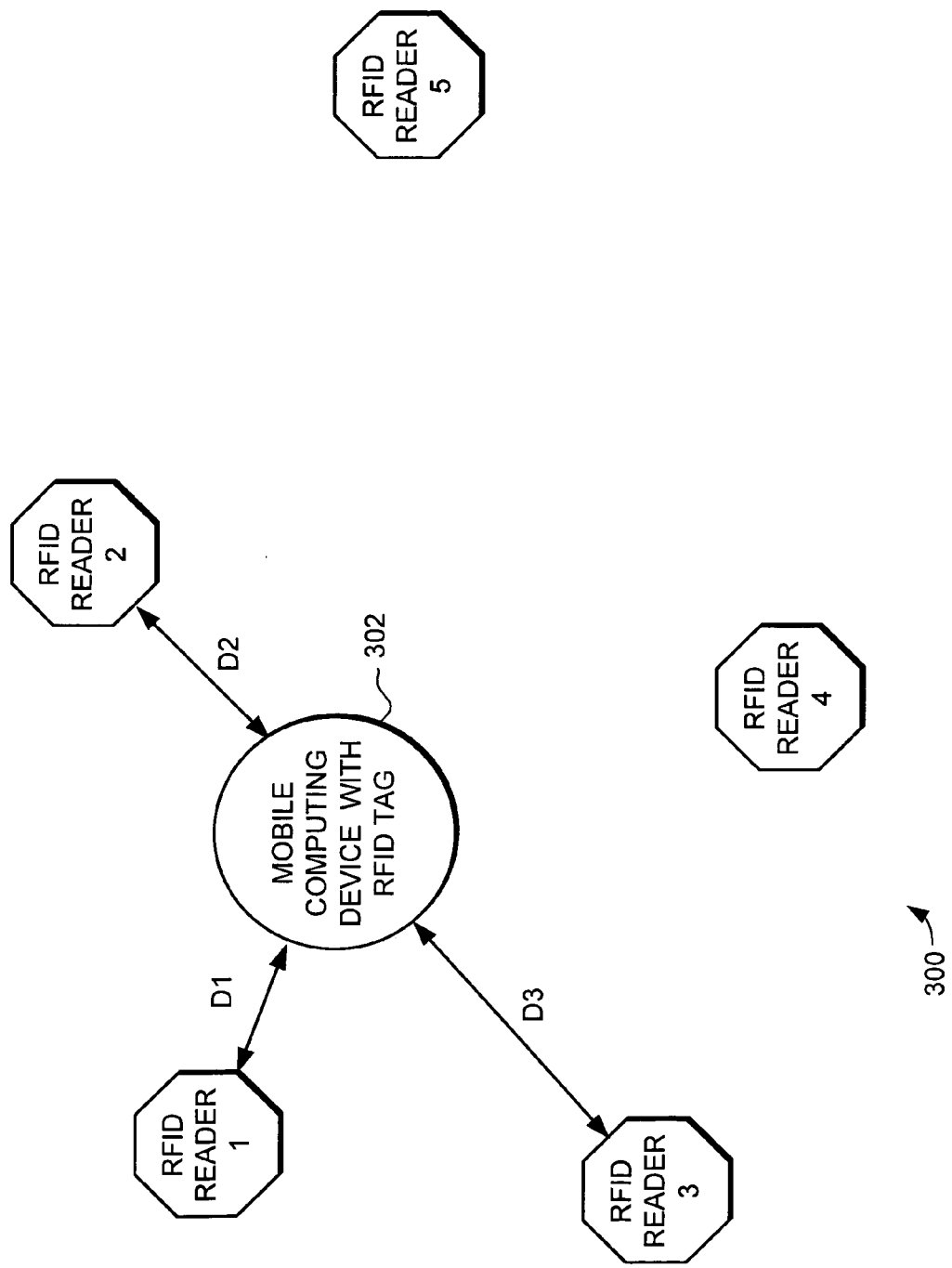
FIG. 3 is a schematic diagram of an array of RFID readers in accordance with an exemplary embodiment of the present invention.

Turning now to FIG. 3, an exemplary array of RFID readers 300 is illustrated in accordance with an exemplary embodiment of the present invention. In this example, the array of RFID readers 300 includes five separate readers. Each reader in the array is used to determine the distance from the reader to mobile computing device that includes an RFID tag. Typically, the readers would be spread throughout an area or facility for which wireless networking system is available. For example, readers can be spaced in the ceilings or floors of a large warehouse and used to provide wireless network access control to computing devices within the warehouse. Additionally, the RFID reader can be included with the various wireless networking access points in the system.

The distances from at least three of the readers, and the known positions of those readers, can then be used to trilaterate and determine a highly accurate location of the mobile computing device. Again, the array of RFID readers transmits a plurality of signals to the RFID tag on the selected mobile computing device. Specifically, each RFID reader transmits a plurality of signals having different fundamental frequencies than at least one signal transmitted by that reader. It should be noted the fundamental frequencies of transmitted signals from different RFID readers could have the same frequencies, as they are not typically directly compared.

In response to the signals transmitted by each reader, the RFID tag produces a plurality of backscatter-modulated signals that are received by the array of RFID readers. The distance between an RFID reader and the RFID tag is calculated using the measured phase of the backscatter-modulated signals that received by that RFID reader, and the corresponding fundamental frequencies for the signals originally transmitted by that reader. Specifically, the change in phase with respect to the change in the frequency is used with equation 1 described above to calculate the difference. Preferably, multiple signals are transmitted and backscatter modulated to each RFID reader until the change in phase with respect to the change in fundamental frequency can be calculated within a specified confidence level. As one example, a linear trend of phase change with respect to fundamental frequency change can be determined by performing a least squares fit analysis of the multiple phase measurements and the corresponding fundamental frequencies. This linear trend is a more accurate "estimated slope" of the phase change versus the frequency change. As the number of the measurements increases, the accuracy of the estimated slope and the calculated distance increases. This process can be continued until the least squares fit generates an estimated slope that is within a desired confidence level, where the confidence level can be calculated using any suitable technique such as "goodness of fit" or any other method of assessing the variance of the data trend from a straight line. This process is then continued until the distance from each reader within range of the tag is known at the desired confidence level.

When the distance from the tag to each RFID reader is calculated, the location of the object can be determined using these distances, the known locations of the readers, and a suitable trilateration technique. In the example illustrated in FIG. 3, the distance D1 between the Reader 1 and the computing device 302, distance D2 between Reader 2 and the computing device 302, and distance D3 between Reader 4 and the computing device 302 can be calculated and used to determine the location of the mobile computing device relative to the known locations of the readers. The location of the mobile computing device can then be used to selectively permit or deny access to the mobile computing device. Three distance measurements are generally sufficient to trilaterate the position of an object, although additional measurements from other readers within range of the object can be used to provide additional accuracy. Furthermore, as few as one or two readers can be used in some applications, although with only one or two readers generating distance measurements, the location of the object cannot be completely disambiguated. For example, in some applications it may be sufficient to determine that the user is within a facility area to allow access where it can be determined with less than three distance measurements. It should also be emphasized that this is a simplified example of a typical RFID reader arrays, and that the number of readers can be greatly expanded depending on the size of the area to be covered and the effective range of the RFID readers.

Figure 4:
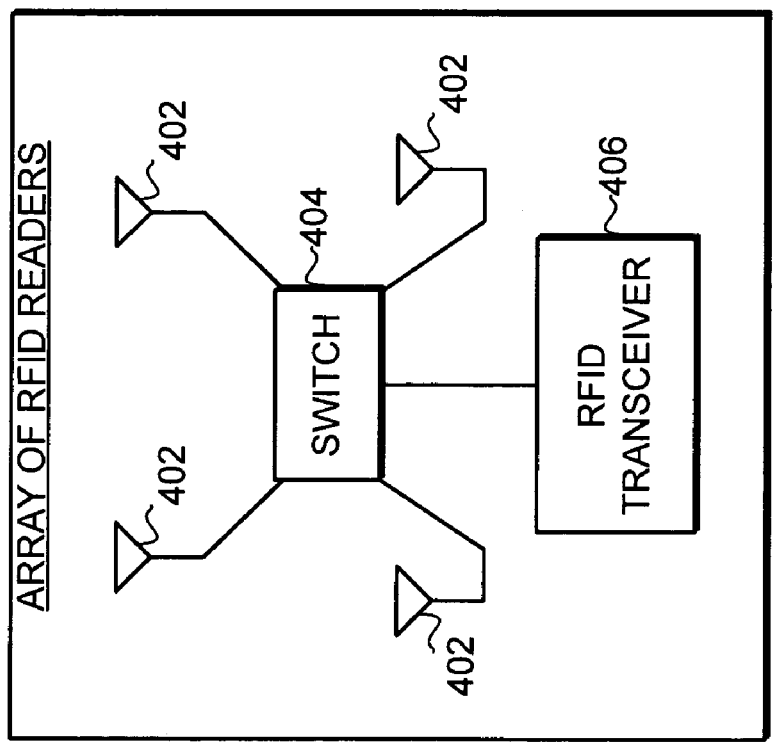
FIG. 4 is a schematic diagram of an array of RFID readers in accordance with a second exemplary embodiment of the present invention.

Turning now to FIG. 4, another exemplary embodiment of an RFID reader array 400 is illustrated. In this embodiment, the array of RFID readers share one RFID transceiver 406. Specifically, the array of RFID readers 400 comprises four physically distributed antennas 402. Instead of providing a separate RFID transceiver for each antenna, the array of RFID readers 400 uses a switch 404 to selectively connect the four antennas to a single RFID transceiver 406. This approach provides the ability to reduce cost in some applications and minimize interference between RFID readers. It should be noted that in other application separate transceivers may be desirable and more cost efficient, depending primarily on the relative cost of the separate transceivers versus cost of separate antennas and cabling.

Again, the RFID reader array 400 can be used to determine the location of mobile computing devices that include RFID tags. The transceiver 406 and switch 404 would be used to transmit a plurality of signals having different fundamental frequencies to a selected RFID tag using one or more of the antennas 402. In response to the signals transmitted by each reader, the RFID tag produces a plurality of backscatter-modulated signals that are received by antennas 402, and selectively passed to the RFID transceiver 406 by switch 404. The phase for these signals can then be determined, and the distance between each antenna and the selected RFID tag can be calculated using the rate of change of the phase and the rate of change of the corresponding fundamental frequencies.

The RFID reader array 400 offers several advantages; the most notably being that by sharing transceivers among multiple antennas, the RFID reader array 400 is able provide the same object location ability at a reduced cost and complexity in many applications. For example, an implementation can use multiple antenna sets, each coupled through a switch to a transceiver, with the multiple transceivers coupled together to cost effectively cover a large area with RFID readers.

In systems such as those illustrated in FIGS. 3 and 4, it is often desirable to compensate for cable differences and other connection lengths to minimize the effect on the measured phases. This calibration can be done by either measuring the distance to a known tag location relative to the RFID reader, or by switching the antenna to a known backscatter reference and setting that distance to zero. In other applications cable calibration may not be required as the phase can be calculated by first taking the difference between two states for each channel, and then calculating the phase using the arctan function.

The system and method can be adapted to a variety of different types of mobile computing devices. For example, the system and method can be adapted for use in mobile personal computers such as laptop computers. As another example, the system and method can be adapted for use in hand held computers such as PDAs, paging and other messaging devices. As another example, the system and method can be adapted for use on telephonic devices. As a final example, the system and method can be adapted for use on special purpose devices such as bar-code readers and other devices used in specific industries.

Figure 5:
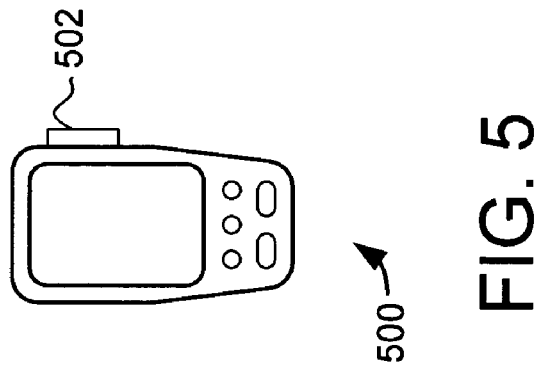
FIG. 5 is top view of an exemplary mobile computing device in accordance with an exemplary embodiment of the present invention.

Turning now to FIG. 5, an exemplary mobile computing device 500 is illustrated. The mobile computing device 500 is exemplary of the type of mobile computing device that can be adapted for use with the security system and method. The mobile computing device 500 includes an RFID tag 502. The RFID tag 502 means that the location of the mobile RFID reader 500 can be determined with RFID readers using the system and methods described above. With the position of the mobile computing device 500 determined, access to the wires networking system can be selectively permitted or denied. It should be noted the RFID tag on the mobile computing device could be implemented by emulating the behavior of a tag using an antenna, transistor, rectifier and the existing microprocessor on the mobile computing device. In this example, the transistor is driven by the microprocessor to create backscatter modulation that imitates a conventional RFID tag.

Figure 6:
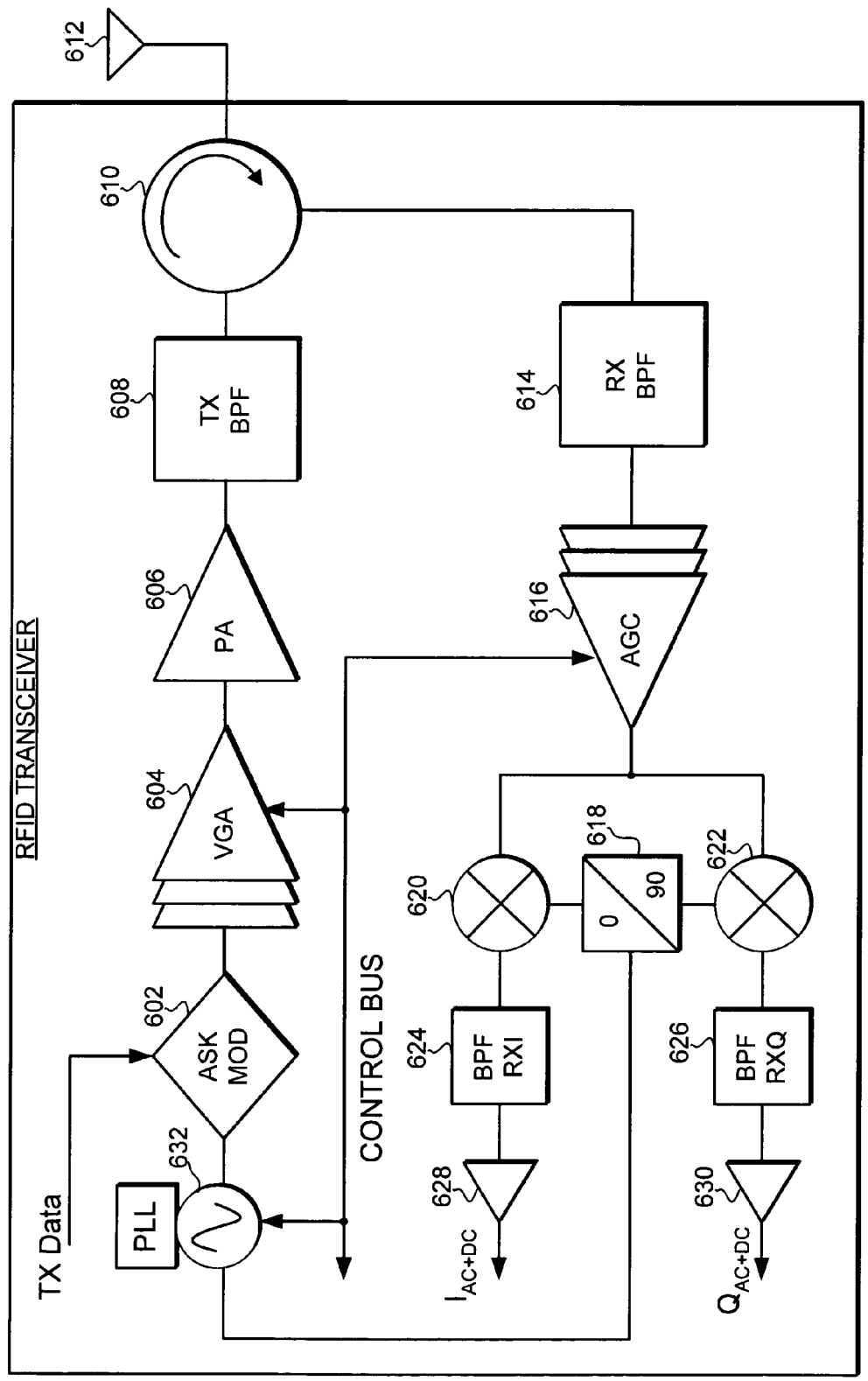
FIG. 6 is a schematic view an exemplary RFID transceiver in accordance with an exemplary embodiment of the present invention.

Turning now to FIG. 6, a RFID transceiver 600 is illustrated in accordance with an exemplary embodiment of the present invention. The RFID transceiver 600 is an example of the type of RFID transceiver that can be used in RFID reader(s) in the object location system and method. The RFID transceiver 600 is designed to transmit and receive signals to and from a selected RFID tag. Furthermore, the RFID transceiver 600 includes a quadrature demodulator. Quadrature demodulators are typically used in quadrature amplitude modulation (QAM) systems that combine two amplitude-modulated signals into a single channel, with two carriers ("I" and "Q") having the same fundamental frequency but differing in phase, typically by 90 degrees. In quadrature demodulation, the two carriers are separated, and the data is extracted from each, and then the data is combined into the original modulating information. The RFID transceiver 600 uses a quadrature demodulator to provide a mechanism for determining the phase of the received backscatter-modulated signal relative to the transmitted signal. Specifically, the AC amplitudes of the separately demodulated "I" and "Q" channels will be used to determine the relative phase of the received backscattered signal. Of course, this is just one example, and other transceiver implementations could be used with other demodulation techniques.

The RFID transceiver 600 includes a modulator 602, a variable gain amplifier 604, a power amplifier 606, a band-pass filter 608, a circulator 610, a band pass filter 614, an automatic gain control 616, demodulators 620 and 622, band pass filters 624 and 626, buffers 628 and 630, and phase-locked-loop oscillator 632. The transceiver 600 transmits signals and receives signals through the antenna 612. Of course, additional antennas could be added using a switch as was described with reference to FIG. 4 above.

In general the transceiver 600 transmits to and receives signals from selected RFID tags that are in the responsive mode. To transmit data, the transceiver encodes transmission data onto a carrier waveform generated by oscillator 632 and broadcasts the signal through the antenna 612 to the RFID tag. Specifically, to transmit data the transceiver 600 uses the modulator 602 and the variable gain amplifier 604 to modulate the carrier signal generated by oscillator 632 with the transmission data (TX Data). The power amplifier 606 amplifies the modulated signal, which is passed through band pass filter 608. The circulator 610 acts as a selective coupler element to antenna 612, where the modulated signal is transmitted to the RFID tags, and substantially isolated from the directly connected receiver.

To receive data from the tag, the transmitter ceases carrier modulation and the receiver receives the modulated backscattered signal via the antenna, strips the signal from the carrier signal, and converts the stripped signal into an in phase "I" component and a quadrature "Q" component. These components can then be independently digitized and sent to a processor for bit recovery, where they can be interpreted by the RFID reader and/or other related systems. Additionally, these components can be used to determine the phase of the received signal relative to the originally transmitted signal, with the phase of the originally transmitted signal serving as a reference measurement to determine the change in phase between the different received signals.

Specifically, the transceiver 600 receives backscatter-modulated signals from the RFID tag via antenna 612. The circulator 610 again acts as a selective coupler element, this time coupling the antenna 612 to the band pass filter 614. The received signal may then be amplified by the automatic gain control 616. This amplified signal may then be carrier-demodulated in quadrature using mixers 620 and 622 and phase shifter 618, which collectively provide two demodulators. This demodulation results in an in-phase signal $I_{AC+DC}$ and the quadrature signal $Q_{AC+DC}$. Each of these signals is passed through a corresponding band-pass-filter (624 and 626) and buffers (628 and 630) before the separate signals are further processed.

It should be noted that in this embodiment the demodulator uses the same signal generated by the phase-lock-loop oscillator 632 that is used for carrier generation of the originally transmitted signal. As such, the phase of this signal can serve as a reference by which the phase change of the received signals can be measured. Specifically, by determining the phase for multiple received signals with respect to the carrier signal, the relative change in phase between those received signals can be calculated. Thus, determining the phase difference of the received backscatter-modulated signal compared to the originally transmitted signals provides a mechanism for determining the rate of change in the phase of the plurality of backscatter-modulated signals.

Again, this is just one example of an RFID receiver that can be used for location based network security. For example, other suitable receivers use separate transmit and receiver configurations. Yet other suitable receivers replace the circulator component with a directional coupler. The advantage of a directional coupler is much lower cost and smaller size but the disadvantage is significant signal loss, hence much lower performance With backscattered signals from the RFID tag demodulated, the phase can be determined and used to calculate the distance to the mobile computing device. As described above, the distance calculator determines the phase in the plurality of backscatter-modulated signals that were received by the RFID reader. From the change in phase and the corresponding change in fundamental frequency in the originally transmitted signals, the distance calculator calculates the distance to the RFID tag using equation 1. The phase differences can then be determined using a variety of different techniques and devices. As one example, the phase of each backscattered signal is referenced to the phase of the originally transmitted signal.

One method for determining the phase of the received signals is to measure the AC amplitude of both I and Q channels and use those measurements to determine the phase angle. That is, the peak-to-peak AC amplitude of the I and Q channel can be averaged over some predetermined time period. The relative phase Φ of the received signal as compared to the carrier phase can be determined as:

$$\Phi = \arctan \frac{Q_{amp}}{I_{amp}} \quad (2.)$$

Where $Q_{AMP}$ is the average AC amplitude in the Q channel and $I_{AMP}$ is the average AC amplitude in the I channel. With the relative phase Φ of multiple backscatter-modulated signals calculated, the phase change between those signals can be calculated and used with the corresponding fundamental frequencies of the transmitted signals to determine the distance to the tag.

Figure 7:
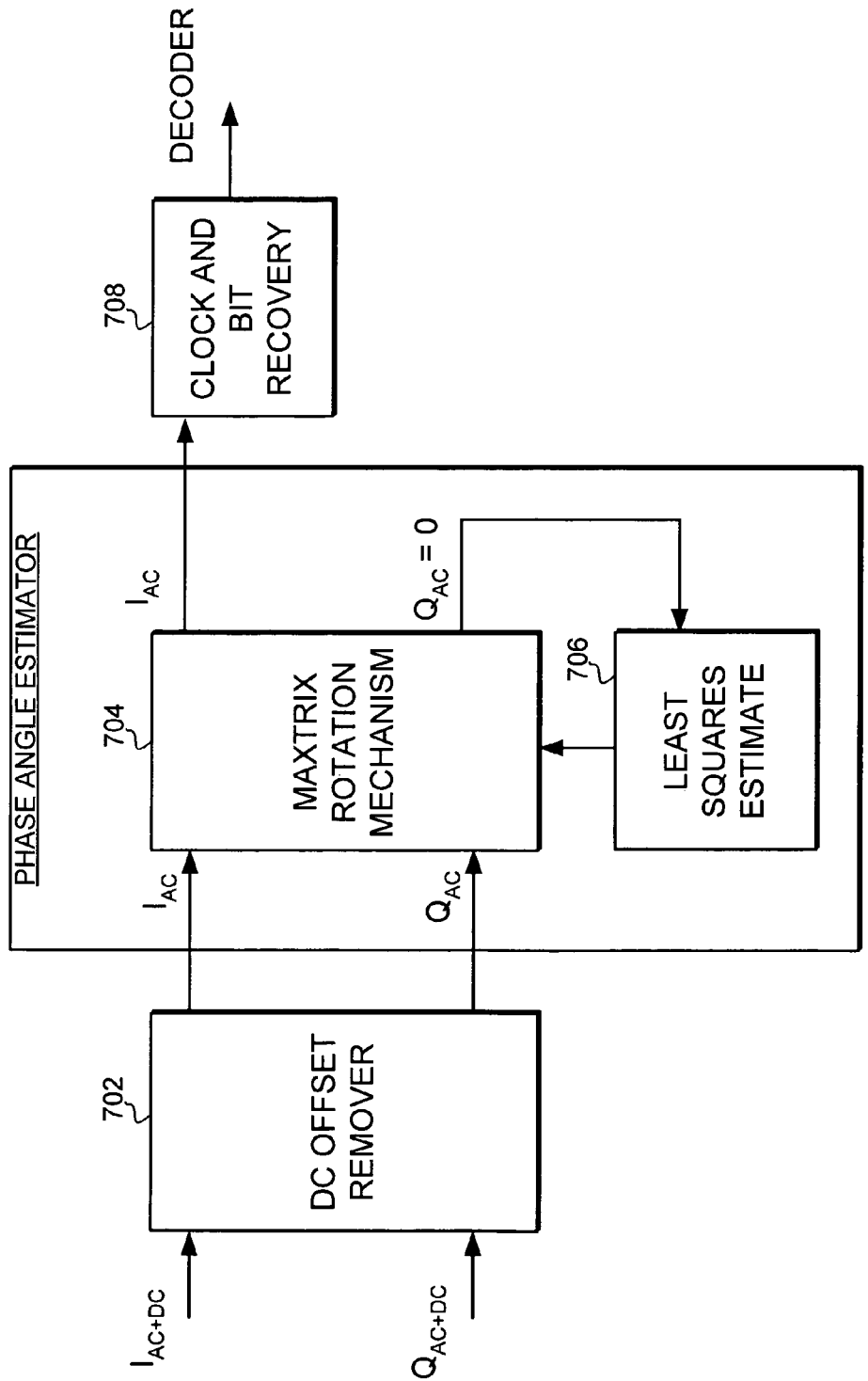
FIG. 7 is a schematic view of an exemplary phase angle estimator in accordance with an exemplary embodiment of the present invention.

Of course, this is just one example of how the phase of the received backscattered signals can be calculated. Turning now to FIG. 7, another exemplary phase angle estimator 700 is illustrated. The phase angle estimator 700 uses the mathematical technique of matrix rotation to determine the phase of the signals. In the illustrated implementation, the I channel signal $I_{AC+DC}$ quadrature signal $Q_{AC+DC}$ are passed to a DC offset remover 702. This removes the DC portion of the I and Q channel signals, leaving only the AC portions of each signal. Additionally, noise rejection can be done at this point as well.

The I channel signal $I_{AC}$ an quadrature signal $Q_{AC}$ are then passed to matrix rotation mechanism 704. The AC amplitudes of these signals are loaded into the matrix. Again, these AC amplitudes can be determined by averaging the AC amplitude over a selected time period. The matrix is then mathematically rotated until the signal in the Q channel is minimized and the signal in the I channel is maximized. The angle of matrix rotation needed to maximize the signal in the I channel is equal to the relative phase of the received signal. In the illustrated example, the minimization of signal in the Q channel is done using a least squares estimate minimization technique. Of course, other suitable techniques could also be used. This method also has the advantage of moving all of the signal to the I channel, where the information in the channel can be recovered and decoded using any suitable technique. Again, with the relative phase of multiple backscattered signals calculated using the phase angle estimator, the phase change between those signals could be calculated and used to determine the distance to the tag.

It should be noted that methods and systems described above for measuring the phase angle of signals cannot always completely disambiguate the phase of a received signals. Specifically, using the arctangent of the amplitudes will always generate a result of between 0 and $2\pi$ radians, when in fact the actual phase can be much greater than $2\pi$. In general, the original measured phase values are referred to as "wrapped", and the process of determining the actual, nominal phase values from the wrapped values is called "phase unwrapping".

Thus, phase unwrapping is a technique that can be used to determine the nominal phase change over a linear span of corresponding fundamental frequencies. One method of phase unwrapping is to linearize the phase shift from the wrapped values. Specifically, the phase unwrapping is accomplished by adding or subtracting multiples of $2\pi$ until the phase measurement in question shows a consistent trend over a frequency span.

As one example of unwrapping, when a set of monotonically increasing fundamental frequencies are used, a monotonic set of phase measurements should result after accounting for any noise. For particular phase measurements that do not follow the monotonic trend, they can be unwrapped by adding or subtracting multiples of $2\pi$ until they show a linear trend over a linear frequency span. A variety of different phase unwrapping algorithms are available that can be adapted for this use, such as signal processing tools available in MATLAB.

Turning now to FIG. 8, a table 800 illustrates an exemplary data set from which the distance to an RFID tag can be determined using an exemplary embodiment of the present invention. Specifically, the table 800 lists 14 transmitted signal fundamental frequencies and a corresponding 14 measured relative phase measurements. It should first be noted that this is just one example data set, and that typical data sets could include more or less data points. It should also be noted that while example data set shows equal distances between fundamental frequencies, that this will not be the case in many applications.

In the example of table 800, the frequency order of the transmitted signals was randomly selected. Again, when random frequency hopping is used the system operates as spread spectrum system and can transmit with increased power under current regulations. Again, this is just one example, and in other cases different frequency hopping procedures can be used.

The phase measurements illustrated in table 800 are wrapped, again meaning that the phase measurements are limited to values between zero and $2\pi$ radians. These values thus do not represent the actual relative phase values, and to accurately calculate the distance it is desirable to unwrap the phase measurements. Turning now to FIG. 9, a table 900 lists the 14 transmitted signal fundamental frequencies in order of fundamental frequency and a corresponding unwrapped 14 measured relative phases. These unwrapped phase values correspond to the actual relative phase of the received backscatter-modulated signals. Again, these unwrapped phase values can be determined by a variety of phase unwrapping techniques, such as adding multiples of $2\pi$ until a consistent linear phase trend is recovered.

Figure 10:
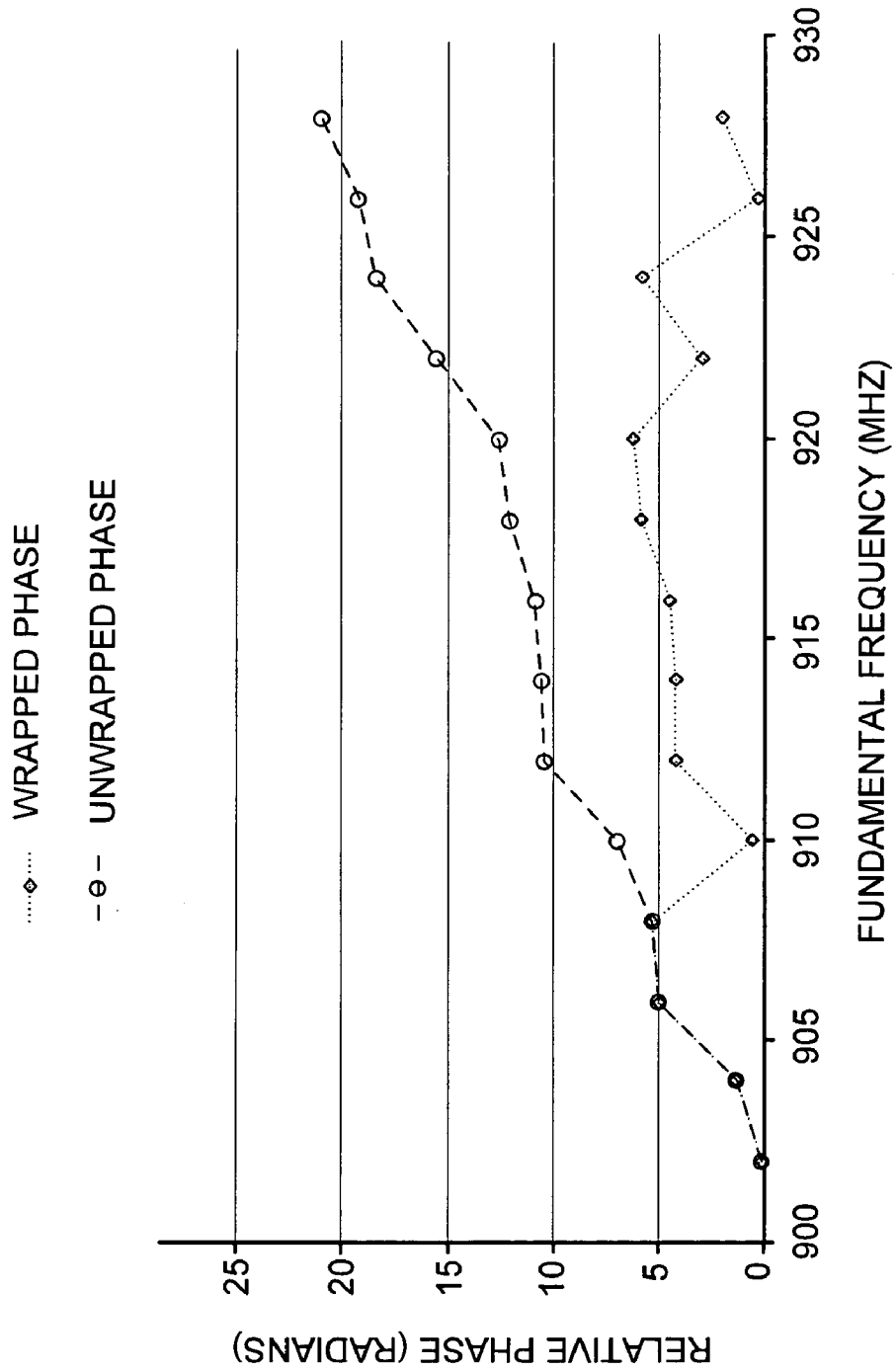
FIGS. 10 and 11 are graph views of an exemplary data set in accordance with an exemplary embodiment of the present invention.

Turning now to FIG. 10, a graph 1000 illustrates the wrapped phase measurements and the unwrapped phase measurements of tables 800 and 900. As can be seen, the unwrapping of phase measurements results in phase measurements that follow a consistent trend. Using phase unwrapping techniques, the underlying phase can be determined even in the presence of significant noise and multi-reflections.

Figure 11:
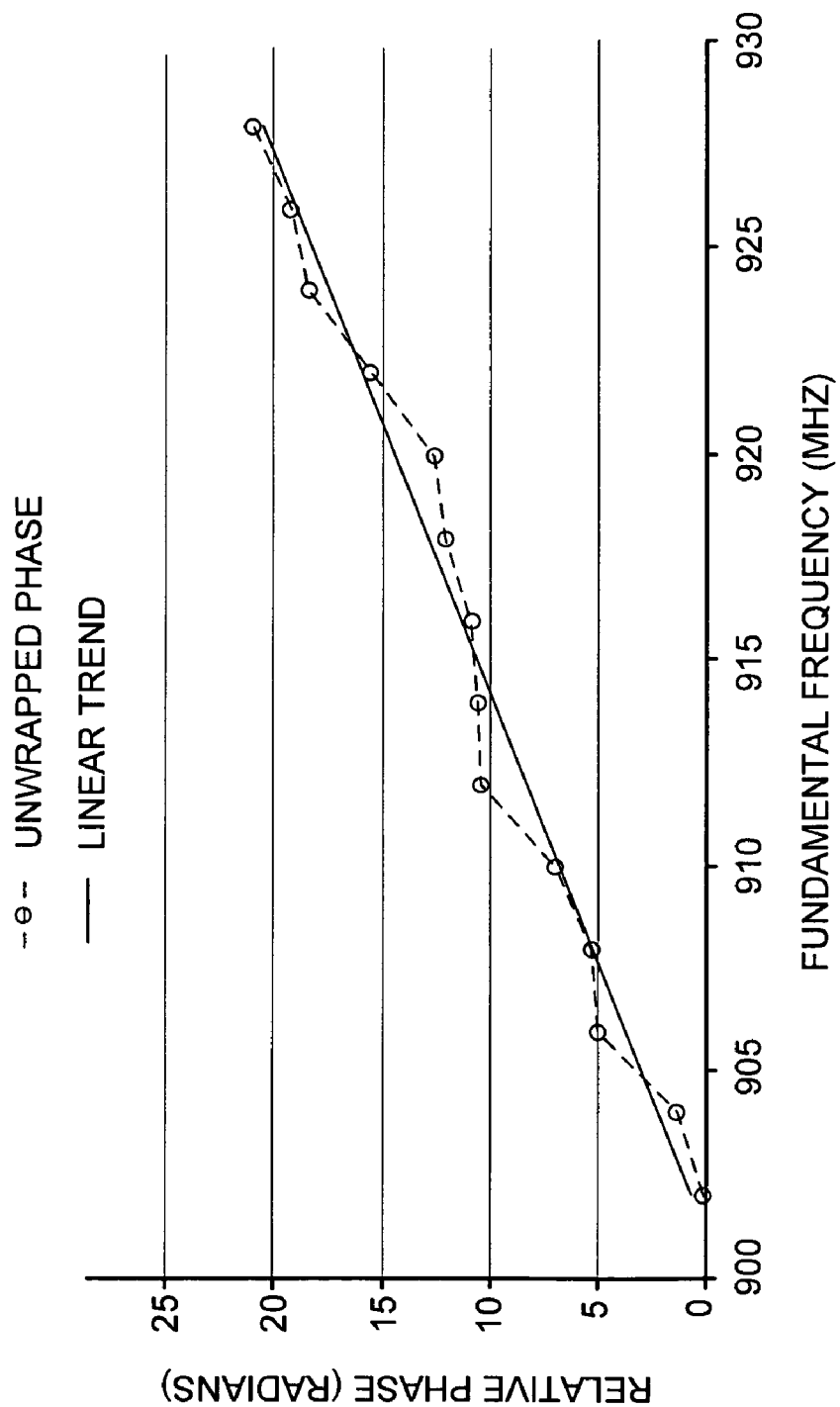

With the unwrapped phase measurements determined, the distance can be determined by calculating the rate of change of the phase with respect to the rate of change of the fundamental frequency. As one example, a linear trend fit of the unwrapped phase measurements the fundamental frequencies can be performed to determine the rate of change. Turning now to FIG. 11, a graph 1100 illustrates the unwrapped phase measurements of table 900 and graph 1000 along with an exemplary linear trend calculated from the phase measurements. The linear trend can be calculated from the data using a variety of techniques such as least squares fit. When calculated the linear trend gives a more accurate calculation of the phase change with respect to the frequency change in the form of the slope of the trend fit line. In the illustrated example, the slope of the linear trend is 9.01E–07 radians/hertz. When calculated, the slope of the linear trend fit line can be used as $\Delta\phi/\Delta f$ in equation 1 to calculate the distance. In this example, using the slope of the linear trend fit line in equation 1 gives a distance measurement of 21.4 meters. Thus, the linear fit method is able to overcome noise in the data such as noise created by multi-path reflections, interference and non-coherent transmissions. Again, this is just one specific example of how a linear trend fit can be used to determine the rate of change of the phase and frequency to calculate the distance to an object with an RFID tag.

The present invention thus provides a security system and method for controlling access to a wireless networking system using RFID tags. The security system and method uses RFID tags to determine the location of mobile computing device. The security system and method selectively allows access to the wireless networking system based on the determined location of the mobile computing device. For example, the security system and method will permit access to the wireless networking system if the mobile computing device is determined to be in an area of permitted access. Conversely, the security system and method will deny access to the wireless networking system if the mobile computing device is determined to be not within an area of permitted access. Thus, the system and method is able to effectively control access to the wireless networking system by only permitting access to mobile devices within designated areas. This limits the ability of outside users to access the wireless networking system without limiting the ability of users inside designated areas.

The system and method can be combined with other networking security procedures to provide an even greater level of security to the networking system.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. A networking security system, the networking security system comprising:
    an RFID reader, the RFID transmitting a signal to an RFID tag, wherein the RFID reader transmits a plurality of transmitted signals to the RFID tag and receives a plurality of backscatter-modulated signals from the RFID tag, at least two of the plurality of transmitted signals having a different fundamental frequency, wherein the at least two of the plurality of transmitted signals having a different fundamental frequency have a randomly selected frequency difference;
    a distance calculator, the distance calculator determining a distance to the RFID tag from the transmitted signal, wherein the distance calculator determines a phase for each of the plurality of backscatter-modulated signals from the RFID tag, and wherein the distance calculator determines the distance to the RFID tag by determining a rate of change of the phase in the plurality of backscatter-modulated signals with respect to rate of change in the fundamental frequency of the plurality of transmitted signals; and
    an access controller, the access controller selectively permitting access from a mobile computing device to a wireless networking system based on the determined distance to the RFID tag.

2. The system of claim 1 wherein the access controller determines if the mobile computing device is in a permitted access area before allowing the mobile computing device to attempt to authenticate on the wireless networking system.

3. The system of claim 1 wherein the access controller determines if the mobile computing unit is in a permitted access area from the determined distance to the RFID tag.

4. The system of claim 1 wherein the RFID tag is coupled to the mobile computing device.

5. The system of claim 1 wherein the RFID reader is coupled to the mobile computing device.

6. The system of claim 1 wherein the wireless networking system comprises a WLAN system.

7. The system of claim 1 wherein the RFID reader continues to transmit additional transmitted signals and receive additional backscatter-modulated signals and wherein the distance calculator continues to determine a phase for each of the additional backscatter-modulated signals received and uses the phase for each additional backscatter-modulated signal to determine the distance from the RFID reader to the RFID tag is until the distance is computed within a specified level of accuracy.

8. The system of claim 1 wherein the rate of change of the phase in the plurality of backscatter-modulated signals with respect to a rate of change in the fundamental frequency of the plurality of transmitted signals is determined by performing a linear trend fit of the phase in the plurality of backscatter-modulated signals versus the fundamental frequency of the plurality of transmitted signals.

9. The system of claim 1 wherein the at least two of the plurality of transmitted signals having a different fundamental frequency have a frequency difference determined by selecting a next available frequency channel using a listen before transmit procedure.

10. A method of controlling access to a wireless networking system, the method comprising the steps of:
    determining a distance to an RFID tag, wherein the step of determining a distance to the RFID tag comprises the steps of:
        transmitting a plurality of transmitted signals from an RFID reader to the RFID tag, wherein at least two of the plurality of transmitted signals have a randomly selected fundamental frequency difference;
        receiving a plurality of backscatter-modulated signals from the RFID tag;
        determining a phase for each of the plurality of backscatter-modulated signals; and
        computing the distance to the RFID tag by determining a rate of change of the phase in the plurality of backscatter-modulated signals with respect to a rate of change in the fundamental frequency of the plurality of transmitted signals; and
    selectively permitting access from a mobile computing device to the wireless networking system based on the determined distance to the RFID tag.

11. The method of claim 10 further comprising the step of preventing the mobile computing device from attempting to authenticate on the wireless networking system until the step of selectively permitting access from a mobile computing device to the wireless networking system based on the determined distance to the RFID tag.

12. The method of claim 10 further comprising the step of determining in the mobile computing unit is in a permitted access area from the determined distance to the RFID tag.

13. The method of claim 10 wherein the RFID tag is coupled to the mobile computing device.

14. The method of claim 10 wherein the mobile computing device includes an RFID reader.

15. The method of claim 10 wherein the wireless networking system comprises a WLAN system.

16. The method of claim 10 wherein the steps of transmitting a plurality of transmitted signals, receiving a plurality of backscatter-modulated signals, and determining a phase in the plurality of backscatter-modulated signals comprises transmitting, receiving and determining a phase for additional transmitted signals and backscatter-modulated signals until the step of computing the distance to the RFID tag determines the distance within a specified level of accuracy.

17. The method of claim 10 wherein the step of computing a distance to the RFID tag by determining a rate of change of the phase in the plurality of backscatter-modulated signals with respect to a rate of change in the fundamental frequency comprises performing a linear trend fit.

18. The method of claim 10 wherein the plurality of transmitted signals have a fundamental frequency difference selected by selecting a next available frequency channel using a listen before transmit procedure.

19. The method of claim 10 wherein the step of determining a phase for each of the plurality of backscatter-modulated signals comprises unwrapping relative phase difference measurements to result in a substantially linear phase trend.

20. The method of claim 10 wherein the step of transmitting a plurality of transmitted signals from the RFID reader to the RFID tag comprises transmitting from an array of RFID readers, and wherein the step of receiving a plurality of backscatter-modulated signals from the RFID tag comprises receiving the plurality of backscatter-modulated signals at the array of RFID readers, and wherein the step of computing a distance to the RFID tag comprises computing a distance from the RFID tag to each of the array of RFID readers.

21. A networking security system, the networking security system comprising:

an array of RFID readers distributed around an area, a plurality of the array of RFID readers transmitting at least three transmitted signals to an RFID tag coupled to a mobile computing device, each of the plurality of the array of RFID readers receiving at least three backscatter-modulated signals from the multi-mode RFID tag, wherein the at least three transmitted signals from each RFID reader have a fundamental frequency with a fundamental frequency difference;

a distance calculator, the distance calculator determining a phase of the at least three backscatter-modulated signals received at each RFID reader, the distance calculator determining a distance from each RFID reader by performing a linear trend fit of the phase in the at least three backscatter-modulated signals and the fundamental frequency of the at least three transmitted signals to determine a rate of change of the phase with respect to a rate of change of the fundamental frequency; and an access controller, the access controller determining if the mobile computing device is in a permitted access area from the distance from each RFID reader, the accesses controller selectively permitting access from the mobile computing device to a wireless networking system based on whether the mobile computing device is in the permitted access area.

22. The system of claim 21 wherein the wireless networking system comprises a WLAN system.

23. The system of claim 21 wherein the access controller determines if the mobile computing device is in a permitted access area before allowing the mobile computing device to attempt to authenticate on the wireless networking system.

24. A method of controlling access to a wireless networking system, the method comprising the steps of:

addressing an RFID tag coupled to a mobile computing device using an RFID reader, the addressing of the RFID tag putting the RFID tag into a responsive state;

transmitting at least three transmitted signals from the RFID reader to the RFID tag, wherein at least two of the at least three transmitted signals have a different fundamental frequency;

receiving at least three backscatter-modulated signals from the RFID tag;

determining a phase for each of the at least three backscatter-modulated signals;

computing a distance to the RFID tag by performing a linear trend fit of the phase in the at least three backscatter-modulated signals and the fundamental frequency of the at least three transmitted signals to determine a rate of change of the phase with respect to a rate of change of the fundamental frequency;

determining if the RFID tag and mobile computing device is in a permitted access area based on the distance to the RFID tag; and selectively permitting access from the mobile computing device to the wireless networking system based on whether the RFID tag and mobile computing device are in the permitted access area.

25. The method of claim 24 wherein the step of transmitting at least three transmitted signals from the RFID reader to the RFID tag comprises transmitting at least three transmitted signals each RFID reader in an array of RFID readers, and wherein the step of receiving at least three backscatter-modulated signals from the RFID tag comprises receiving at least three backscatter-modulated signals at each RFID reader in the array of RFID readers, and wherein the step of computing a distance to the RFID tag comprises computing a distance from the RFID tag to each RFID reader in the array of RFID readers.

26. The method of claim 24 wherein the wireless networking system comprises a WLAN system.

27. The method of claim 24 further comprising the step of preventing the mobile computing device from attempting to authenticate on the wireless networking system until the step of selectively permitting access from a mobile computing device to the wireless networking system based on the determined distance to the RFID tag.

* * * * *

UNITED STATES PATENT AND TRADEMARK OFFICE
CERTIFICATE OF CORRECTION

| | |
|---|---|
| PATENT NO. | : 7,574,732 B2 |
| APPLICATION NO. | : 10/954957 |
| DATED | : August 11, 2009 |
| INVENTOR(S) | : Knox et al. |

It is certified that error appears in the above-identified patent and that said Letters Patent is hereby corrected as shown below:

IN THE CLAIMS

In Column 19, Line 14, in Claim 21, after "signals from the" delete "multi-mode".

Signed and Sealed this
Fourth Day of October, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,574,732 B2 | Page 1 of 1 |
| APPLICATION NO. | : 10/954957 | |
| DATED | : August 11, 2009 | |
| INVENTOR(S) | : Knox et al. | |

It is certified that error appears in the above-identified patent and that said Letters Patent is hereby corrected as shown below:

ON THE TITLE PAGE

Before Inventors: delete reference to "(76)" and insert -- (75) --.

After the title, please insert the following:
-- (73) Assignee: Symbol Technologies, Inc., Holtsville, NY (US) --.

IN THE SPECIFICATION

1. In Column 5, Line 3, delete "performance" and insert -- performance, --, therefor.

2. In Column 14, Line 26, delete "performance" and insert -- performance. --, therefor.

3. In Column 14, Line 53, Delete "QAMP" and insert -- Qamp --, therefor.

4. In Column 14, Line 64, delete "IAMP" and insert -- Iamp --, therefor.

IN THE CLAIMS

5. In Column 19, Line 14, in Claim 21, after "signals from the" delete "multi-mode".

Signed and Sealed this
Thirteenth Day of March, 2012

David J. Kappos
*Director of the United States Patent and Trademark Office*